Figure 1:
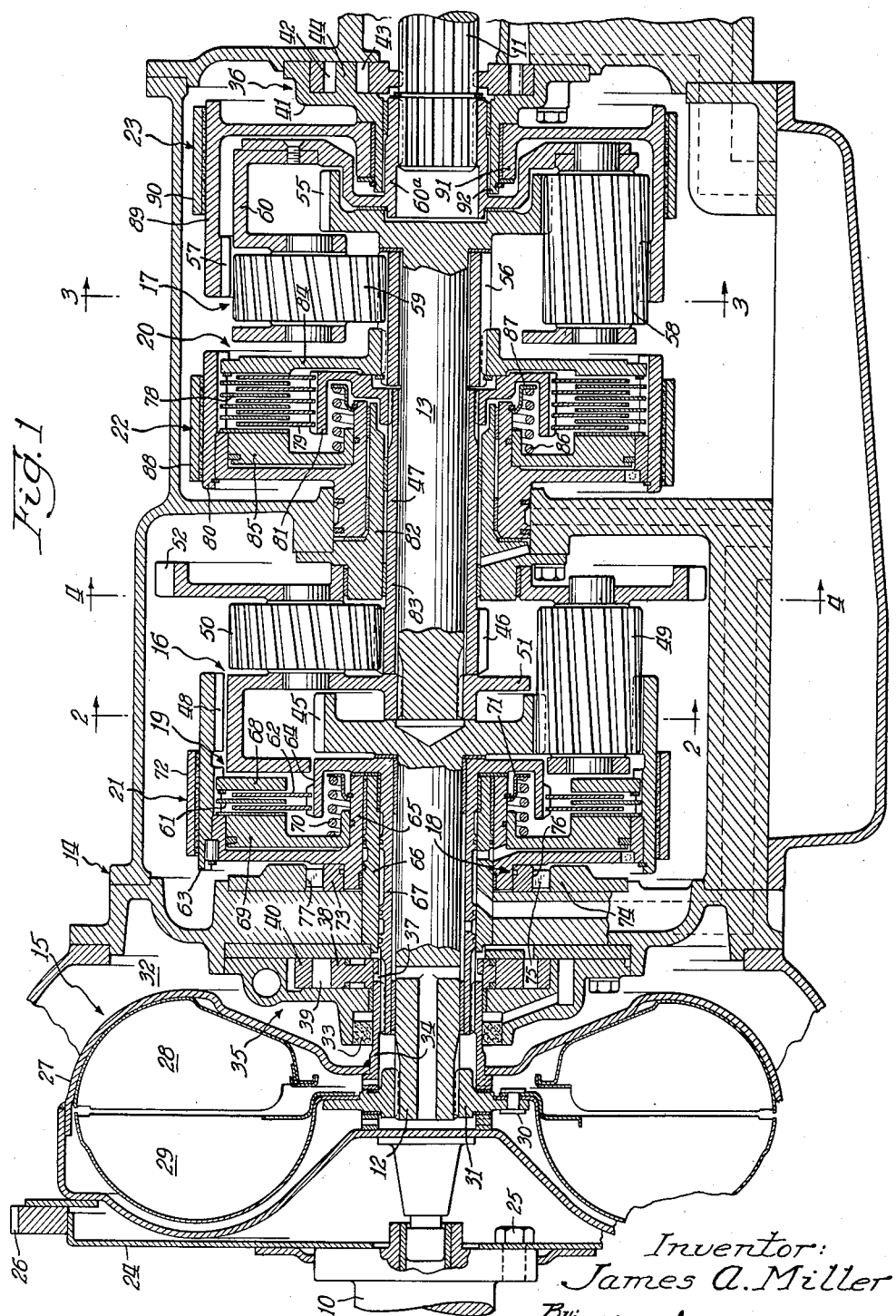

Feb. 2, 1960
J. A. MILLER
2,923,178
TRANSMISSION
Filed May 12, 1954
3 Sheets-Sheet 2
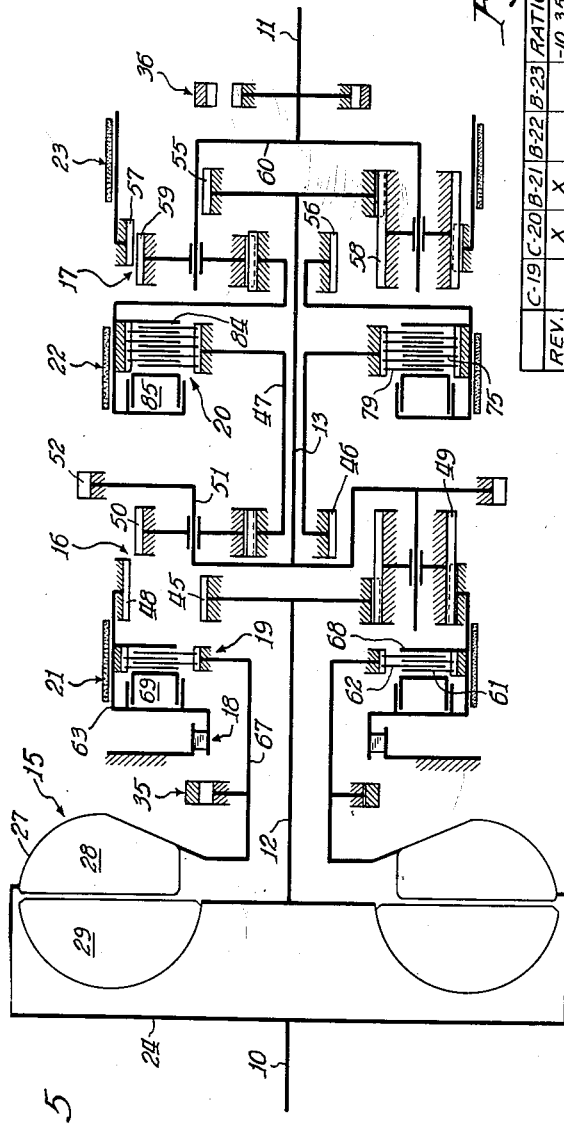
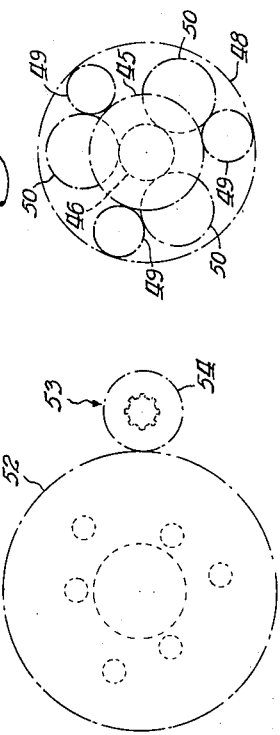
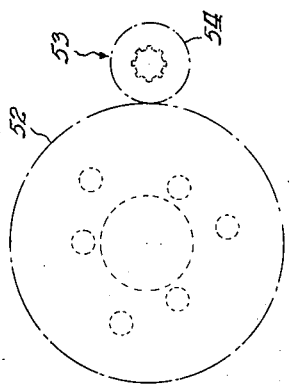
Inventor:
James A. Miller
By Keith J. Blewer
Atty.

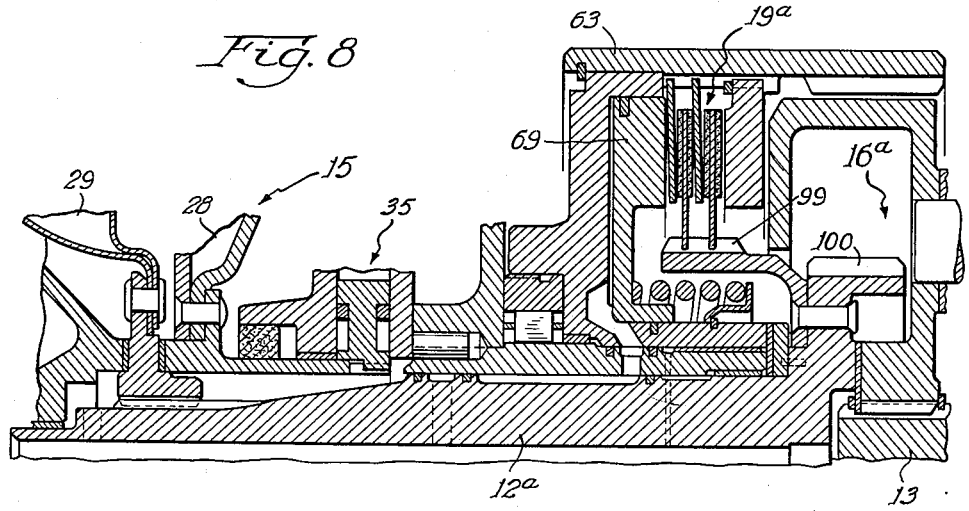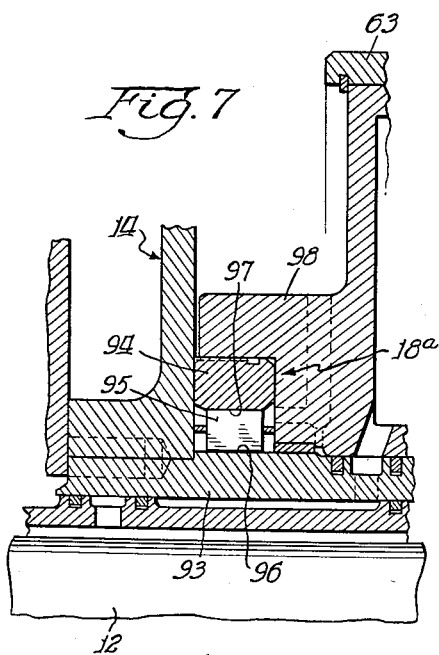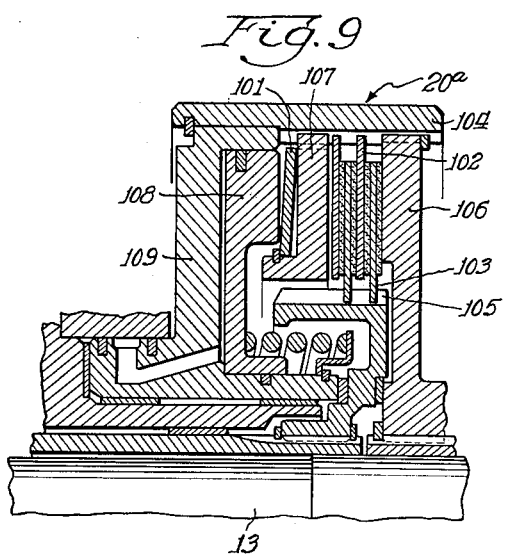

United States Patent Office 2,923,178
Patented Feb. 2, 1960

2,923,178
TRANSMISSION

James A. Miller, Grosse Pointe Park, Mich., assignor to Borg-Warner Corporation, Chicago, Ill., a corporation of Illinois Application May 12, 1954, Serial No. 429,268

20 Claims. (Cl. 74—761)

My invention relates to transmissions and more particularly to transmissions suitable for a truck-type of vehicle.

It is an object of the invention to provide an improved transmission having five speeds in forward drive and one speed in reverse drive, all speeds being completed by engagement of friction engaging mechanisms, so that changing between the various ratios may be accomplished without interruption of torque from the driving engine of the vehicle.

It is another object of the invention to so arrange the transmission that only two multiple disc friction clutches and three friction brakes of the band variety are required for completing five different speed ratios in forward drive and one speed ratio in reverse drive.

It is also an object to provide such a transmission comprising two planetary gear sets, with the transmission being advantageously compact for ready installation in a truck-type vehicle.

It is an additional object to provide such a transmission with a fluid coupling connected in tandem with the planetary gearing, with the latter being capable of providing five different speed ratios in forward drive and one speed ratio in reverse drive. It is contemplated that the planetary gearing shall preferably include two planetary gear sets in tandem.

It is an object of my invention to provide a transmission that is so arranged that the forward speed drives may be so changed sequentially from one ratio to another, that for each change from low to second, from second to third, thence from third to fourth and finally from fourth to fifth, only one friction device need be disengaged while a single friction device is engaged.

Another important object of my invention is to provide a transmission having five speed ratios in forward drive with substantially equal steps between third and fourth speed ratios and fourth and fifth speed ratios that are small compared to the substantially equal steps between first and second speed ratios and second and third speed ratios.

It is an additional object to provide an improved transmission adapted for automatic operation which supplies five speed ratios in forward drive that are properly spaced over a relatively wide ratio range so as to make the transmission particularly adaptable for heavy truck-type vehicles, and also provide a two-path flow for the fourth and fifth speed ratios.

A specific object of the invention is to provide a power take-off gear for driving an instrumentality on a vehicle either when the vehicle is stationary or when the vehicle is in motion.

It is a further object of my invention to provide a transmission with an automatic operation that can be overruled at any speed.

Another object of my invention is to provide a transmission having a manually selected first speed with a normally starting second speed and with third, fourth and fifth speeds being automatically upshifted.

The invention consists of the novel constructions, arrangements and devices to be hereinafter described and claimed for carrying out the above-stated objects and such other objects as will appear from the following description of preferred embodiments illustrated with reference to the accompanying drawings, wherein:

Fig. 1 is a longitudinal sectional view of a transmission embodying the principles of the invention;

Figs. 2, 3 and 4 are longitudinal sectional views taken respectively on lines 2—2, 3—3 and 4—4 of Fig. 1 in the directions indicated;

Fig. 5 is a schematic diagram of the transmission shown in Fig. 1;

Fig. 6 is a table indicating the various friction engaging mechanisms which are engaged to complete the various speed ratios through the transmission and in addition showing the mechanical ratios and percentage steps between the ratios for an embodiment of the transmission with certain gear sizes; and Figs. 7, 8 and 9 are longitudinal sectional views of certain parts of the transmission showing modified constructions.

Like characters of reference designate like parts in the several views.

Referring to the drawings, the illustrated transmission, which is one particularly suitable for use in a truck-type vehicle comprises, in general, a drive shaft 10, a driven shaft 11, a first intermediate shaft 12 and a second intermediate shaft 13. The shaft 10 is adapted to be connected to the engine of the vehicle in which the transmission is installed, and the shaft 11 is adapted to be connected to the driving road wheels of the vehicle by means of any suitable mechanism (not shown). The shafts 11, 12 and 13 are all coaxially disposed and are journalled within a transmission casing 14. The transmission also comprises a straight vaned fluid coupling 15, two "dual pinion type" planetary gear sets 16 and 17, a one-way brake 18, two multiple disc friction clutches 19 and 20 and three friction brakes 21, 22 and 23 of the brake band type.

The intermediate shaft 12 is driven by the drive shaft 10 through a flywheel 24 and the fluid coupling 15. The flywheel is bolted to the drive shaft 10 as shown at 25 and consists of a thin flexible plate that actually serves as a flexible driving coupling, thus minimizing any engine disturbances and any effect of misalignment between the engine and transmission. A starter ring gear 26 is attached to the outer periphery of the thin flywheel.

The fluid coupling 15 comprises a fluid casing 27 that is connected with the drive shaft 10 through flywheel 24, a vaned driving member 28 known as the impeller and connected to rotate therewith and a vaned driven member 29 known as a turbine that is riveted as shown at 30 to a hub 31 which is splined to the shaft 12. The coupling 15 itself is filled with oil under pressure, but a cavity 32 in the transmission casing 14 in which it is housed is dry, there being a synthetic oil seal 33 on an impeller hub 34 at the rear of the coupling to prevent leakage into the cavity 32.

The transmission incorporates two oil pumps 35 and 36 that are of ordinary construction and are of types commonly used, and hence only a general description will be given. The front pump 35, which is driven by tabs or fingers 37 formed on the hub 34 of the coupling impeller 28, is a variable capacity vane type, and the rear pump, which is driven by the driven shaft 11 of the transmission, is a fixed displacement internal-external gear type. The front pump 35 comprises, in general, an internal hub 38 carrying a plurality of vanes 39 equally spaced about its periphery and slidably disposed in the hub 38, and an outer housing 40 nonrotatable and radially slidable with respect to the transmission casing 14 and having an internal cylindrical surface on which the vanes 39 rest and slide. Pumping action is obtained by the vanes carrying liquid between them from the pump inlet to the pump outlet, when the hub 38 and housing 40 are eccentrically disposed. The rear pump 36 comprises, in general, a housing 41 which is fixed with respect to the external casing 14 of the transmission and eccentrically arranged inner and outer gears 42 and 43 that are disposed within the housing 41. The pump 36 is also provided with a segmental casing portion 44 carried by the housing 41 that is located between the gears 42 and 43. Pumping action is obtained by fluid being carried by the gears across the segmental casing portion. The pumps 35 and 36 may be utilized to pressurize and feed oil to the fluid coupling, to provide fluid pressure for engaging the friction clutches 19 and 20, and the friction brakes 21, 22 and 23 and to provide lubrication for the entire transmission and any necessary cooling oil for the friction brakes and clutches.

The planetary gear set 16 comprises a first sun gear 45 integrally formed with the first intermediate shaft 12; a second sun gear 46 integrally formed with a sleeve 47 which is rotatably disposed on the shaft 13; a ring gear 48 connected to both the clutch 19 and the brake 21; elongated planet or pinion gears 49 (one being shown in Fig. 1) in mesh with the sun gear 45 and the ring gear 48; planet or pinion gears 50 (one being shown in Fig. 1) which are in mesh with the sun gear 46 and the elongated planet gears 49 and a planet gear carrier 51 that rotatably supports the planet gears 49 and 50 and is connected to the second intermediate shaft 13. The first sun gear 45 is connected to the driven member 29 of the coupling 15 through the hub 30, and the second sun gear 46 is connected to the clutch 20 through the sleeve 47.

A power take-off gear 52 is formed on the planet gear carrier 51 of the first planetary gear set 16 and mates with a standard power take-off unit 53 that has a slidably movable gear 54 that can be conveniently engaged or disengaged with the power take-off gear 52. The unit 53 may be introduced from either side of the transmission casing 14 but is shown on one side as in Fig. 4.

The planetary gear set 17 comprises a sun gear 55 integrally formed with the second intermediate shaft 13, a second sun gear 56 rotatably disposed on the second intermediate shaft 13, a ring gear 57 connected to the brake 23 and rotatably mounted with respect to the pump housing 41, elongated planet or pinion gears 58 (one being shown in Fig. 1) in mesh with the sun gear 55 and the ring gear 57, planet or pinion gears 59 (one being shown in Fig. 1) which are in mesh with the second sun gear 56 and the elongated planet gears 58 and a planet gear carrier 60 that rotatably supports the planet gears 58 and 59 and is integrally formed with a sleeve portion 60a that is splined to the driven shaft 11. The first sun gear 55 of the second planetary gear set 17 is connected through the second intermediate shaft 13 to the planetary gear carrier 51 of the first planetary gear set 16, and the second sun gear 56 is connected to the clutch 20 and the brake 22.

The friction clutch 19 is arranged to lock the impeller 28 of the fluid coupling 15 with the ring gear 48 of the first planetary gear set and comprises clutch plates or discs 61 and 62 which are splined to a brake drum 63 and a drum 64 respectively. The brake drum 63 is fixed on a radially extending hub 65 which is rotatably supported on a fixed sleeve portion 66 that is connected to the casing 14, and the drum 64 is integrally formed with a sleeve portion 67 that is journalled within the fixed sleeve portion 66 and is splined within the impeller hub 34. The plates 61 extend inwardly from the brake drum 63 and are interleaved with the plates 62 between a backing plate 68 splined to the brake drum 63 and an annular piston 69 which is disposed and movable in an annular cavity provided in the hub 65, so that upon application of fluid pressure to the piston 69 through suitable passages, the clutch plates 61 and 62 are frictionally engaged. A spring 70 is disposed between the piston 69 and a spring retainer 71 which is fixed with respect to the hub 65. The spring 70 acts on the piston 69 to return the piston to clutch disengaging position.

The friction brake 21 is provided for the ring gear 48 and comprises a brake band 72 that is adapted to grip the brake drum 63. The brake drum 63 also serves as a housing for the clutch 19 and is connected to the sleeve portion 65 which is supported in the casing 14 by the stationary sleeve portion 66.

The one-way brake 18 is of an ordinary type and comprises the outer and inner race members 73 and 74, and a plurality of tiltable sprags 75 disposed between and in contact with the race members 73 and 74. The inner race member 73 has a cylindrical surface 76 and is splined to the sleeve portion 65, and the outer race member 74 has a cylindrical surface 77 and is fixed to the transmsision casing 14. The one-way brake 18 is incorporated into the transmission between the brake drum 63 and the transmission casing 14 and serves to prohibit backward rotation of the ring gear 48.

The friction clutch 20 is arranged to lock the second sun gear 46 of the first planetary gear set 16 with the second sun gear 56 of the second planetary gear set 17 and comprises clutch plates or discs 78 and 79 which are splined within a brake drum 80 and on a drum 81, respectively. The brake drum 80 is splined on a radially extending hub 82 which is rotatively supported on a fixed sleeve portion 83 that is connected to the casing 14, and the drum 81 is splined to the sleeve 47 on which the sun gear 46 is formed. The sleeve 47 is rotatably journalled in the fixed sleeve portion 83, as shown. The plates 78 extend inwardly from the brake drum 80 and are interleaved with the plates 79 between a backing plate 84 and an annular piston 85 which is disposed and movable in an annular cavity provided in the hub 82, so that upon application of fluid pressure to the piston 85 through suitable passages, the clutch plates 78 and 79 are frictionally engaged. The backing plate 84 is splined to both the drum 80 and sun gear 56. A spring 86 is disposed between the piston 85 and a spring retainer 87 which is fixed with respect to the hub 82. The spring 86 acts on the piston 84 to return the piston to clutch disengaging position.

The friction brake 22 is provided for the second sun gear 56 and comprises a brake band 88 that is adapted to grip the brake drum 80. The brake drum 80 also serves as a housing for the clutch 20 as shown.

The friction brake 23 is provided for the ring gear 57 and comprises a brake drum 89 which is integrally formed with the ring gear 57 and a brake band 90 that is adapted to grip the brake drum 89. The brake drum is connected to a hub 91 that is rotatably supported on a fixed sleeve portion 92 that is integrally formed with the rear pump housing 41.

A modified brake construction 18a is shown in Fig. 7 to take the place of the one-way brake 18 shown in Fig. 1. The one-way brake 18a comprises outer and inner race members 93 and 94, and a plurality of tiltable sprags 95 disposed between and in contact with the race members 93 and 94. The inner race member 93 has a cylindrical surface 96 and in this instance is fixed to the transmission casing 14, and the outer race member 94 has a cylindrical surface 97 and is splined to a hub portion 98 that is formed on the brake drum 63. The construction shown in Fig. 7 differs from the construction shown in Fig. 1 in that the inner race member 73 of Fig. 1 is shown as the outer race member 94 in Fig. 7 and the outer race member 74 in Fig. 1 is shown as the inner race member 93. The purpose of this modification is to reduce the diameter of the one-way brake 18 in Fig. 1 to that of the one-way brake 18a in Fig. 7 so as a result the friction velocities of the contacting surfaces will also be reduced.

Further modification of the transmission in Fig. 1 is shown in Fig. 8 wherein the multiple plate or disc clutch 19 of Fig. 1 has been redesigned so that the clutch hub or sleeve portion 67 is no longer connected to the impeller 28 of the fluid coupling 15. A substitute clutch 19a shown in Fig. 8 differs from the clutch 19 in Fig. 1 in that an inner drum 99 of the clutch is connected to a first sun gear 100 of a first planetary gear set 16a. The sleeve portion 67 of Fig. 1 is completely eliminated, and a first intermediate shaft 12a is shown with an increased diameter to compensate for the removal of the sleeve 67. The shaft 12a is tapered at one end in order to be connected with the turbine 29 of the fluid coupling 15. All other elements in Fig. 8 correspond with those in Fig. 1. The purpose of this modified form is to permit "full fluid" drive in fourth and fifth speeds as will hereinafter be described.

An additional modification is seen in Fig. 9 in which the clutch 20 of Fig. 1 is redesigned to incorporate a Belleville washer 101. A substitute friction clutch 20a as seen in Fig. 9 comprises clutch plates 102 and 103 which are splined to a brake drum 104 and a drum 105, respectively. The plates 102 extend inwardly from the brake drum 104, and the plates 103 extend outwardly from the drum 105. These plates are interleaved between a backing plate 106 and an axially movable pressure plate 107, both of which are splined to the brake drum 104. An annular piston 108 is disposed and movable in an annular cavity provided in a drum 109, on which the brake drum 104 is fixed, so that upon application of fluid pressure to the piston 108 through suitable passages, the plates 102 and 103 are frictionally engaged between the backing plate 106 and the pressure plate 107, application of pressure to the plate 107 being through the Belleville washer 101. When this pressure is applied through the Belleville washer 101, there is a momentary dwell before the clutch plates 102 and 103 are engaged. The purpose of this momentary dwell when the clutch 20a is engaged is to create a smooth shift between the speed ratios, that would otherwise require a pressure reducing valve for eliminating the roughness between the shifts.

In the operation of the transmission, as shown in Figs. 1 to 5, which may effectively be utilized in a truck-type vehicle since the transmission is particularly adapted for heavy duty use, there are provided along with a neutral condition, five speed ratios in forward drive and one speed ratio in reverse drive. The transmission may be operated automatically or manually. When operated automatically the vehicle is preferably started in the second speed ratio and automatically upshifts to third, fourth, and fifth speed ratios. The first speed ratio as well as the reverse speed ratio may be then manually selected.

The neutral condition occurs when none of the friction brakes or clutches for the rear gear set 17 are engaged. The carrier 51 for the front planetary gear set 16 is nevertheless driven due to the one-way brake 18 operating to hold the ring gear 48 stationary as will be hereinafter described in connection with the power take-off gear, but there is no torque output transmitted to the driven shaft 11 since there are no reaction elements in the rear gear set 17 that are engaged.

The transmission is conditioned for a two-way low speed or first speed forward drive by applying the friction brakes 21 and 23 which are effective to hold the ring gears 48 and 57 stationary. As a result, the drive is completed from the drive shaft 10 throuugh the fluid coupling 15, the first intermediate shaft 12, the sun gear 45, the planet gears 49, the planet gear carrier 51, the second intermediate shaft 13, the sun gear 55, the planet gears 58, the planet gear carrier 60 to the driven shaft 11. The reaction of the planetary gearing 16 is taken by the brake 21 functioning through the ring gear 48 and the planet gears 49; and the reaction of the planetary gearing 17 is taken by the brake 23 functioning through the ring gear 57 and the planet gears 58. With the brakes 21 and 23 engaged, the planetary gear sets 16 and 17 both transmit drive at reduced speed and increased torque. The two planetary gear sets 16 and 17 are in effect connected in tandem so that the over-all torque multiplication of the gear sets is the product of the torque multiplication of the two gear sets. The fluid coupling 15 functions for low speed drive to gradually complete this drive when the engine throttle is open assuming that the brakes 21 and 22 have been previously engaged for gradually starting the vehicle from rest. The fluid coupling, as will hereinafter appear is in various of the other speed ratios, and the vehicle can likewise be started in these other speed ratios. In the event a one-way drive is desired, instead of a two-way drive, the brake 21, which is in parallel with the one-way brake 18, may be disengaged; and in this event, the one-way brake 18 will hold the ring gear 48 stationary without the assistance of the brake 21, and the vehicle when proceeding down a hill will coast with the engine idling and with the one-way brake 18 disengaged.

The drive in second speed forward ratio is obtained by disengaging friction brake 23 while engaging the friction brake 22 and allowing friction brake 21 to remain engaged for a two-way drive. The second speed power train is the same as the first speed power train except that the drive through the planetary gear set 17 is changed. The reaction in this case, instead of being taken by the ring gear 57, is now taken by the sun gear 56, and the result is that the drive through the second planetary gear set 17 is increased in speed but decreased in torque multiplication, the speed ratio in the gearing 17 still, however, remaining at less than one to one. The friction brake 22, instead of the friction brake 23 takes the reaction of the gear set 17 in second speed ratio. The brake 21, as in the case of low speed drive may be disengaged to provide a one-way drive if desired. In addition, the one-way brake 18 by holding the ring gear 48 stationary in second speed gives the transmission the feature of an automatic upshift from second speed to third and when downshifting the brake 18 by over-running succeeds to decrease the downshift bump that occurs when downshifting between third speed to second.

The drive in third speed forward ratio is obtained by engaging the friction clutch 20 while disengaging the friction brake 21 and allowing friction brake 22 to remain engaged. Engagement of clutch 20 is obtained by applying fluid under pressure to the piston 85, thereby frictionally engaging the clutch plates or discs 78 and 79 with each other between the backing plate 84 and the piston 85. The third speed power train is through the fluid coupling 15, as for the first and second speed ratios, and the drive from thence is through the intermediate shaft 12, the sun gear 45, the planet gears 49 and 50, the planet gear carrier 51, the sun gear 55, the planet gears 58 and 59 and the planet gear carrier 60 to the driven shaft 11. The reaction of the first gear set is taken by the sun gear 46 and the reaction of the second gear set 17 is taken by the sun gear 56. The sun gears 46 and 56 are locked together by the clutch 20 and are held stationary within the transmission casing by the brake 22. Since both sun gears 46 and 56 are held by the brake 22 and the clutch 20 from rotating in either direction, the third speed forward drive is a two-way drive.

The drive in fourth speed forward ratio is obtained by disengaging the clutch 20 while engaging the clutch 19 and allowing brake 22 to remain in engagement. As a result of the above engagements, a two-path divided torque drive through the front planetary gear set 16 is created, with approximately 35 percent passing through the fluid coupling 15 and the remaining 65 percent directed through the ring gear 48. The drive can be traced through a two path flow in the first planetary gear set 16, with one part of the drive passing through the fluid coupling 15, the first intermediate shaft 12 and the sun gear 45 to the planet gears 49, and the second part passing through the sleeve portion 67 from the fluid coupling casing 27, the clutch 19 and the ring gear 48 to the planet gears 49; and thence continuing as a single path flow through the planet gear carrier 51, the second intermediate shaft 13, the sun gear 55, the planet gears 58 and 59 and the planet gear carrier 60 to the driven shaft 11. The clutch 19 functions to connect the ring gear 48 with the drive shaft 10, when the piston 69 is under fluid pressure, frictionally engaging the clutch plates or discs 61 and 62 with each other between the backing plate 68 and the piston 69. When the vehicle engine speeds are above idling, there is generally a little slip in the fluid coupling 15 and under these conditions there is little relative rotation between the parts of the gear set 16, and the shaft 13 is thus driven nearly at the same speed as the shaft 10. The planetary gearing 17 provides a torque multiplication for this drive, the reaction of the gearing 17 being taken by the brake 22 effective on the sun gear 56 as in second and third speed ratios.

The fifth speed forward ratio is completed by disengaging friction brake 22 while engaging friction clutch 20 and allowing clutch 19 to remain engaged. When both friction clutches are engaged, the drive is direct, although there is a slight loss in speed due to slippage in the coupling. Under this arrangement, as in the fourth speed forward drive, there is a two-path power flow. The shaft 13 is driven through two paths of power flow as in fourth speed ratio and the sun gear 55 of the planetary gear set 17 is driven from the shaft 13. The power from the shaft 10 that is combined in the planetary gear set 16 as in fourth speed ratio, also causes the sun gear 46 of the gear set 16 to be driven, and a second path of input power to the gear set 17 is provided from the sun gear 46. The sun gear 46 drives the sun gear 56 of the gear set 17 through the clutch 20. The planet gears 59 and 58 combine the power from the two sun gears 56 and 55 to drive the carrier 60 which in turn drives the driven shaft 11.

The modified form of Fig. 8 differs from that in Fig. 1 in that there is only a single path of power flow instead of two that can be traced through the first planetary gear set for the fourth and fifth speeds. The drive in this modified version is referred to as a "full fluid" drive and passes through the fluid coupling 15. It is the only drive since the sleeve portion 67 is eliminated in this modified form.

In order to obtain reverse drive, the friction clutch 20 and the friction brake 21 are engaged. This permits the reaction of the planetary gear set 16 to be taken by the friction brake 21 holding the ring gear 48 stationary. The gear set 16 then has two output members and the gear set 17 has two input members; that is, the carrier 51 of the gear set 16 introduces torque into the gear set 17 through the input sun gear 55 while the remainder of the torque is transmitted from the reaction sun gear 46 of gear set 16 to the reaction sun gear 56 of gear set 17. As a result the drive is then traced from the fluid coupling 15, the first intermediate shaft 12, the sun gear 45 and the planet gears 49 and 50, at which point the torque output follows a split-path flow arrangement in which one path proceeds through the planet gear carrier 51, the second intermediate shaft 13, the sun gear 55, the planet gears 58 and the planet gear carrier 60 to the driven shaft 11; and the other path proceeds through the sun gear 46, the clutch 20, the sun gear 56, the planet gears 59 and 58 and the planet gear carrier 60 to the driven shaft 11.

The power take-off gear 52 which is connected to the planet gear carrier 51 of the first planetary gear set 16 may be utilized for driving any selected instrumentality on the vehicle, whether or not the vehicle is actually being driven through the transmission. The power take-off unit 53, which may incidentally be located on either side of the transmission, utilizes the slidably movable gear 54 for convenient engagement of the power take-off gear 52. A power train from the drive 10 through the gear set 16 to the power take-off gear 52 is completed at all times. The one-way brake 18 automatically takes the reaction of the gear set 16 for driving the gear 52 from the shaft 10 in a one-way drive, and the brake 21 may be engaged to make this drive a two-way drive. The clutch 19 may be engaged to change the rate at which the gear 52 is driven. When the brake 18 is effective with the brake 21 being engaged or disengaged, the drive is traced from the drive shaft 10 through the fluid coupling 15, the first intermediate shaft 12, the sun gear 45, the planet gears 49 and the planet gear carrier 51 to the power take-off gear 52; and when the clutch 19 is engaged, the drive can be traced from the drive shaft 10, the sleeve 67, the clutch 19, the ring gear 48, the planet gears 49 and the planet gear carrier 51 to the power take-off gear 52. In the event it is desired that the gear 54 be inactive when the vehicle is being driven in any of the forward speed ratios, it is simply necessary to axially move the gear 54 out of mesh with the gear 52.

Since the over-all torque multiplication of the gear sets is the product of the torque multiplication of the two gear sets, it will be found that in a particular embodiment for the first speed ratio when the input element or the sun gear 45 of the first planetary gear set 16 is revolving clockwise at 1000 r.p.m.'s, the elongated planet gear 49 will revolve counter-clockwise at 1522 r.p.m.'s and the output element or the planet gear carrier 51 will revolve clockwise at 348 r.p.m.'s. The input element or sun gear 55 in the second planetary gear set 17 also will revolve clockwise at 348 r.p.m.'s with the elongated planet gear 58 revolving counter-clockwise at 529 r.p.m.'s and the output element or planet gear carrier 60 and the driven shaft 11 revolving clockwise at 121 r.p.m.'s. Therefore in determining the ratios between the input and the output elements, the number of r.p.m.'s (121) of the output element is divided into the number of r.p.m.'s (1000) of the input element and the resulting ratio is approximately 8.28 to 1.00. For this same embodiment the ratios for the second to the fifth speed ratio are determined to be approximately 4.23, 2.16, 1.47 and 1.00, respectively. From the above figures it is possible to determine the percentage steps between the various speed ratios. For example, the ratio of the second speed is subtracted from that of the first speed ratio (8.28 minus 4.23) and this difference is 4.05. When this difference (4.05) is divided by the ratio (4.23) determined in the second speed it will give the resulting percentage step of 95.8%. In other words, the torque ratio (8.28) of the first speed is 95.8% greater than that of the second speed ratio (4.23). Substantially the same percentage step occurs between the second and third speed ratios while a substantially smaller step of 46.9% exists between the third and fourth speed ratios and between the fourth and fifth speed ratios.

My improved transmission advantageously includes a pair of planetary gear sets 16 and 17, which are connected in tandem with each other and are capable of providing five different speed ratios in forward drive and one speed ratio in reverse drive with the minimum number of clutches, gears and brakes. In addition a fluid coupling 15 is connected in tandem with the two planetary gear sets 16 and 17 for gradually completing the drive when the engine throttle is open. No positive engaging devices are utilized, and the power trains are all completed by friction engaging devices, so that the transmission may be changed from one speed ratio to another without any interruption of torque of the driving engine. This is accomplished by means of two multiple disc friction clutches and three friction brakes of the band type.

An additional important advantage is that the transmission has an ample ratio range for heavy duty trucks with the five forward speed ratios being so arranged as to provide substantially equal steps between the first and second speed ratios and the second and third speed ratios which are considerably larger than the substantially equal steps between the third and fourth speed ratios and the fourth and fifth speed ratios. The smaller steps being more desirable because these gears are used more often. The percentage steps shown in the graph in Fig. 6 are one particular embodiment of the invention and are respectively 95.8%, 95.8%, 46.9% and 46.9%.

Another important advantage is that the transmission is so arranged that the forward speed drives may be so changed sequentially that for each change from low to second, thence from second to third, then from third to fourth and finally from fourth to fifth, only one friction device, a clutch or brake, need be engaged while a single other friction device is disengaged to complete the change.

Additional advantages of my invention are that although the transmisison is automatically operated it can be manually overruled at any speed, and in the fourth and fifth speeds a two-path flow is provided. A further advantage is the elimination of the downshift bump that generally occurs when the transmission downshifts from third speed to second.

The power take-off gear 52 advantageously may be driven through the gearing 16 and the fluid coupling 15 either when the drive shaft 11 is effectively disconnected from the shaft 13 due to the friction devices of the planetary gearing 17 being disengaged or when the drive is completed from the shaft 13 to the shaft 11 by engagement of one of the friction devices for the gearing 17. Thus the driven instrumentality of the vehicle operated by the power take-off gear 52 may be driven either when the vehicle is stationary or when the vehicle is in motion.

I wish it to be understood that my invention is not to be limited to the specific constructions and arrangements shown and described except only insofar as the claims may be so limited as it will be understood to those skilled in the art that changes may be made without departing from the principles of the invention.

1. In a transmission; the combination of a drive shaft; a driven shaft; a planetary gear set comprising a ring gear, a pair of sun gears, a first one of which is driven by said drive shaft and the second of which is rotatably supported on said driven shaft, an elongated planet gear, a second planet gear, said elongated planet gear being in mesh with said second planet gear and said first sun gear and said ring gear, said second planet gear in addition being in mesh with said second sun gear, and a planet gear carrier for rotatably supporting both of said planet gears, said planet gear carrier being connected to said driven shaft; a band brake for said ring gear and a one-way brake in parallel with said band brake and a second band brake for said second sun gear; and a friction clutch for locking said ring gear to said drive shaft; each of said brakes when engaged completing a single path power train through said gear set from said drive shaft to said driven shaft and said clutch when engaged completing a two-path power train from said drive shaft to said driven shaft through said gear set.

2. In a transmission; the combination of a drive shaft; a driven shaft; a first planetary gear set and a second planetary gear set; said first planetary gear set having an input element driven by said drive shaft, an output element and two reaction elements; said second planetary gear set having an input element connected with said output element of said first planetary gear set, an output element connected to the driven shaft and two reaction elements; a clutch for locking one of said reaction elements of said first planetary gear set with said drive shaft; a clutch for locking together one of said reaction elements of said first planetary gear set with one of said reaction elements of said second planetary gear set; a brake for one of said reaction elements in said first planetary gear set and brakes for each of said reaction elements in said second planetary gear set.

3. In a transmission; the combination of a drive shaft; a driven shaft; a first planetary gear set and a second planetary gear set; said first planetary gear set having a first sun gear driven by said drive shaft, two reaction elements including a second sun gear and a ring gear, planet gears interconnecting said first and second sun gears and said ring gear, and a carrier for said planet gears; said second planetary gear set having a first sun gear as an input element connected with said carrier of said first planetary gear set, a second sun gear and a ring gear, planet gears interconnecting said first and second sun gears and said ring gear, and a carrier for said planet gears; clutch means for locking one of said reaction elements of said first planetary gear set with said drive shaft; clutch means for locking together one of said reaction elements of said first planetary gear set with one of said reaction elements of said second planetary gear set; and brake means for one of said reaction elements in said first planetary gear set and brake means for each of said reaction elements in said second planetary gear set; said clutch means and brake means being engageable in different pairs in order to complete five different speed ratios in forward drive from said drive shaft to said driven shaft.

4. In a transmission; the combination of a drive shaft; an intermediate shaft; a driven shaft; a first planetary gear set and a second planetary gear set; said first planetary gear set having a first sun gear driven by said drive shaft, a ring gear, a second sun gear rotatably supported on said intermediate shaft, an elongated planet gear and a second planet gear, said elongated planet gear being in mesh with said ring gear and said first sun gear, said second planet gear being in mesh with said elongated planet gear and said second sun gear, and a carrier for said planet gears connected to said intermediate shaft; said second planetary gear set having a first sun gear as an input element connected with said intermediate shaft, a planet gear carrier as an output element connected to said driven shaft, two reaction elements including a ring gear and a second sun gear, and two sets of planet gears interconnecting said input and said output elements and carried by said carrier; a first clutch for connecting said ring gear of said first planetary gear set with said drive shaft and a second clutch for connecting together said second sun gear of said first planetary gear set with one of said reaction elements of said second planetary gear set and a first brake for said ring gear in said first planetary gear set and a second and third brake for each of said reaction elements in said second planetary gear set; said transmission providing first, second, third, fourth and fifth speed ratios in forward drive with said first, second and third speed ratios constituting a single path of flow through both of said gear sets and said fourth power train constituting a two-path power flow through said first gear set and said fifth power train constituting two paths of power flow through both gear sets; said first power train being completed by engagement of said first and third brakes; said second power train being completed by said first and second brakes; said third power train being completed by said second brake and said second clutch; said fourth power train being completed by said second brake and said first clutch and said fifth power train being completed by both of said clutches.

5. In a transmission; a combination of a drive shaft; an intermediate shaft; a driven shaft; a first planetary gear set and a second planetary gear set; said first planetary gear set having a first sun gear driven by said drive shaft, a ring gear, a second sun gear rotatably supported on said intermediate shaft, an elongated planet gear and a second planet gear, said elongated planet gear being in mesh with said ring gear and said first sun gear, said second planet gear being in mesh with said elongated planet gear and said second sun gear, and a planet gear carrier rotatably supporting both of said planet gears, said planet gear carrier connected to said intermediate shaft; said second planetary gear set having a first sun gear connected to said intermediate shaft, two reaction elements including a ring gear and a second sun gear, an elongated planet gear and a second planet gear, said elongated planet gear being in mesh with said ring gear and said first sun gear, said second planet gear being in mesh with said elongated planet gear and said second sun gear, and a planet gear carrier rotatably supporting both of said planet gears, said planet gear carrier connected to said driven shaft; a first clutch for connecting said ring gear of said first planetary gear set with said drive shaft and a second clutch for connecting together said second sun gear of said first planetary gear set with said second sun gear of said second planetary gear set and a first brake for said ring gear of said first planetary gear set and a second and third brake for each of said reaction elements in said second planetary gear set; said transmission providing first, second, third, fourth and fifth speed ratios in forward drive with said first, second and third speed ratios constituting a single path of flow through both of said gear sets and the fourth power train constituting a two-path power flow through said first gear set and said fifth power train constituting two paths of power flow through both gear sets; said first power train being completed by engagement of said first and third brakes; said second power train being completed by said first and second brakes; said third power train being completed by said second brake and said second clutch; said fourth power train being completed by said second brake and said first clutch and said fifth power train being completed by both said clutches.

6. In a transmission; the combination of a drive shaft; a driven shaft; a first planetary gear set and a second planetary gear set; said first planetary gear set having a first sun gear as an input element driven by said drive shaft, a planetary gear carrier as an output element, two reaction elements including a second sun gear and a ring gear and planetary gears interconnecting said sun gear and ring gear and carried by said carrier; said second planetary gear set having an input element connected with output element of said first planetary gear set, an output element connected to said driven shaft and two reaction elements; clutch means for locking one of said reaction elements of said first planetary gear set with said drive shaft; clutch means for locking said other reaction element of said first planetary gear set with one of said reaction elements of said second planetary gear set; brake means for one of said reaction elements of said first planetary gear set and brake means for each of said reaction elements in said second planetary gear set; said clutch means and brake means being engageable in different pairs in order to complete five different speed ratios in forward drive from said drive shaft to said driven shaft.

7. In a transmission; the combination of a drive shaft; a driven shaft; a first planetary gear set having two input elements including a first sun gear and a ring gear, a second sun gear, a first planet gear and a second planet gear, said first planet gear being in mesh with said first sun gear and said ring gear and said second planet gear being in mesh with said first planet gear and said second sun gear, and a planet gear carrier for rotatably supporting said planet gears; a second planetary gear set having an input element which is connected to be driven from said planet gear carrier of said first planetary gear set and connected to drive said driven shaft; a fluid coupling for connecting said first sun gear of said first planetary gear set with said drive shaft; clutch means for connecting said ring gear of said first planetary gear set with said drive shaft thereby providing a two-path power train through said first planetary gear set from said drive shaft and a single path power train through said second planetary gear set to said driven shaft; and brake means for said ring gear of said first planetary gear set to render this element a reaction element for thereby providing a single path power flow through said first planetary gear set.

8. In a transmission; the combination of a drive shaft; a driven shaft; a first planetary gear set having two input elements including a first sun gear and a ring gear, a second sun gear, a first planet gear and a second planet gear, said first planet gear being in mesh with said first sun gear and said ring gear, said second planet gear being in mesh with said first planet gear and said second sun gear, and a planet gear carrier rotatably supporting both of said planet gears; a second planetary gear set having a first sun gear connected to said planet gear carrier of said first planetary gear set, two reaction elements including a ring gear and a second sun gear, a first planet gear and a second planet gear, said first planet gear being in mesh with said first sun gear and said ring gear, said second planet gear being in mesh with said first planet gear and said second sun gear, and a planet gear carrier rotatably supporting both of said planet gears, said planet gear carrier being connected to said driven shaft; a fluid coupling for connecting one of said input elements of said first planetary gear set with said drive shaft and clutch means for connecting said other input element of said first planetary gear set with said drive shaft in order to provide a two-path power train through said first planetary gear set from said drive shaft; clutch means for locking together said second sun gear of said first planetary gear set with said second sun gear of said second planetary gear set and brake means for each of said reaction elements of said second planetary gear set in order to provide a single path power train through said second planetary gear set; and break means for said ring gear of said first planetary gear set to render this element a reaction element for thereby providing a single path power flow through said first planetary gear set.

9. In a transmission, the combination of a drive shaft, a driven shaft, a first planetary gear set having a first sun gear and a ring gear as first and second input elements respectively, and a second sun gear and planet gear carrier as first and second output elements respectively, said sun gears and ring gear being drivingly interconnected by planet gears mounted on said carrier, a second planetary gear set having an output element connected to drive said driven shaft and having first and second input elements respectively connected to said first and second output elements of said first planetary gear set, all of said elements of said second gear set being drivingly interconnected by planet gears, a hydrodynamic device for connecting said first input element of said first planetary gear set to said drive shaft and clutch means for connecting said second input element of said first planetary gear set to said drive shaft thereby providing a two-path power train from said drive shaft through said first planetary gear set and from thence through said second planetary gear set to said driven shaft, a friction brake for said second input element of said first planetary gear set to render this element a reaction element for completing a single path power train through said first planetary gear set and a friction brake for said second input element of said second planetary gear set to render this element a reaction element for providing a single path power flow through said second planetary gear set.

10. In a transmission, the combination of a drive shaft, a driven shaft, a first planetary gear set having a first sun gear and a ring gear as first and second input elements respectively and a second sun gear and planet gear carrier as first and second output elements respectively, said sun gears and ring gear being drivingly interconnected by planet gears mounted on said carrier, a second planetary gear set having an output element connected to drive said driven shaft, said second gear set having first and second input elements, said first input element of said second planetary gear set being connected with said first output element of said first planetary gear set and clutch means for connecting said second output element of said first planetary gear set with said second input element of said second planetary gear set, all of said elements of said second gear set being drivingly interconnected by planet gears, a hydrodynamic device for connecting said first input element of said first planetary gear set to said drive shaft and clutch means for connecting said second input element of said first planetary gear set to said drive shaft thereby providing a two-path power train from said drive shaft through said first planetary gear set and from thence through said second planetary gear set to said driven shaft, a friction brake for said second input element of said first planetary gear set to render this element a reaction element for completing a single path power train through said first planetary gear set and a friction brake for said second input element of said second planetary gear set to render this element a reaction element for providing a single path power flow through said second planetary gear set.

11. In a transmission, the combination of a drive shaft, a driven shaft, a first planetary gear set having a first sun gear and a ring gear as first and second input elements respectively and a second sun gear and a planet gear carrier as first and second output elements respectively, said sun gears and ring gear being drivingly interconnected by planet gears mounted on said carrier, a second planetary gear set having an output element connected to drive said driven shaft and having first and second input elements respectively connected to said first and second output elements of said first planetary gear set and a reaction element, all of said elements of said second gear set being drivingly interconnected by planet gears, a hydrodynamic device for connecting said first input element of said first planetary gear set to said drive shaft and clutch means for connecting said second input element of said first planetary gear set to said drive shaft for providing a two-path power train from said drive shaft through said first planetary gear set and from thence through said second planetary gear set to said driven shaft; a friction brake for said second input element of said first planetary gear set to render this element a reaction element for completing a single path power train through said first planetary gear set, a friction brake for said reaction element of said second planetary gear set for providing a single path power train of a certain ratio through said second planetary gear set and a friction brake for said second input element of said second planetary gear set to render this element a reaction element for providing a single path power flow through said second planetary gear set of a different ratio.

12. In a transmission; the combination of a drive shaft; a driven shaft; a first planetary gear set and a second planetary gear set; said first planetary gear set having a first sun gear driven by said drive shaft, two reaction elements including a second sun gear and a ring gear, planet gears interconnecting said first and second sun gears and said ring gear, and a carrier for said planet gears, said second planetary gear set having a first sun gear as an input element connected with said carrier of said first planetary gear set, a planet gear carrier as an output element connected to said driven shaft, two reaction elements including a second sun gear and a ring gear, and planet gears rotatably mounted on said carrier and interconnecting said first and second sun gears and said ring gear; clutch means for locking one of said reaction elements of said first planetary gear set with said first sun gear; clutch means for locking together one of said reaction elements of said first planetary gear set with one of said reaction elements of said second planetary gear set; and brake means for one of said reaction elements in said first planetary gear set and brake means for each of said reaction elements in said second planetary gear set; said clutch means and brake means being engageable in different pairs in order to complete five different speed ratios in forward drive from said drive shaft to said driven shaft.

13. In a transmission; the combination comprising a drive shaft; a driven shaft; a first planetary gear set comprising a first sun gear element, a second sun gear element, a ring gear element, a first planet gear in mesh with one of said sun gear elements and said ring gear element, a second planet gear in mesh with the other of said sun gear elements and said first planet gear, and a carrier element for said first and second planet gears; a second planetary gear set comprising a third sun gear member, a fourth sun gear member, a second ring gear member, a third planet gear in mesh with said second ring gear member and with one of said two last mentioned sun gear members, a fourth planet gear in mesh with the other of said last mentioned sun gear members and said third planet gear, and a second carrier member for said third and fourth planet gears; said first sun gear element being connected with said drive shaft and one of said members being connected with said driven shaft; another of said elements and another of said members being connected together; a first clutch for connecting another of said elements with said drive shaft; a second clutch for connecting still another of said elements with still another of said members; and a plurality of brakes for certain of said elements and said members which clutches and brakes complete a plurality of drives between said shafts when selectively engaged.

14. In a transmission; the combination as specified in claim 13; said clutches and brakes being of the friction type; one of said brakes being effective on the said element connectible by said first clutch with said drive shaft; said another element connected by said second clutch to one of said members being said second gun gear element.

15. In a transmission; the combination as specified in claim 13; said another element connected by said second clutch to one of said members being said second sun gear element; said another element connected by said first clutch to said drive shaft being said second sun gear element.

16. In a transmission, the combination comprising a drive shaft, a driven shaft, a first planet gear set having a plurality of planet gear interconnected drive and drive receiving elements a first one of which is driven from said drive shaft, a second planet gear set having a plurality of planet gear interconnected drive and drive receiving elements a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said two last-named elements for holding said third elements stationary when said clutch is also engaged for rendering these elements reaction elements for completing a drive between said shafts through said two planet gear sets, and another engaging device effective on another of the elements of said first gear set for completing a drive between said shafts when said clutch is also engaged during which drive power flows in two paths between said two gear sets, one path being between said second elements and the other path being between said third elements.

17. In a transmission, the combination comprising a drive shaft, a driven shaft, a first planet gear set having a plurality of planet gear interconnected drive and drive receiving elements a first one of which is driven from said drive shaft, a second planet gear set having a plurality of planet gear interconnected drive and drive receiving elements a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said two last-named elements for holding said third elements stationary when said clutch is also engaged for rendering these elements reaction elements for completing a drive between said shafts through said two planet gear sets, and a second brake constructed and arranged to hold another of said elements of said first gear set for completing a drive between said shafts when said clutch is also engaged during which drive power flows in two paths between said two gear sets, one path being between said second elements and the other path being between said third elements.

18. In a transmission, the combination comprising a drive shaft, a driven shaft, a first planet gear set having a plurality of planet gear interconnected drive and drive receiving elements a first one of which is driven from said drive shaft, a second planet gear set having a plurality of planet gear interconnected drive and drive receiving elements a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said two last-named elements for holding said third elements stationary when said clutch is also engaged for rendering these elements reaction elements for completing a drive between said shafts through said two planet gear sets, and a second clutch constructed and arranged effectively to connect another of said elements of said first gear set to said drive shaft for completing a drive between said shafts when said clutch is also engaged during which drive power flows in two paths between said two gear sets, one path being between said second elements and the other path being between said third elements.

19. In a transmission, the combination of a drive shaft, a driven shaft, a first planet gear set having a plurality of planet gear interconnected drive and drive receiving elements a first one of which is driven from said drive shaft, a second planet gear set having a plurality of planet gear interconnected drive and drive receiving elements a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said two last-named elements for holding said third elements stationary when said clutch is also engaged for rendering these elements reaction elements for completing a drive between said shafts through said two planet gear sets, and a second brake effective on another element of said first gear set for completing a drive between said shafts when said clutch is also engaging during which drive power flows in two paths between two gear sets one path being between said second elements and the other path being between said third elements, and a second clutch for effectively connecting together two elements of said first planet gear set for completing a substantially one to one drive between said shafts when said first-named clutch is also engaged and in which the power flows similarly in two paths between said two gear sets.

20. In a transmission, the combination of a drive shaft, a driven shaft, a first planet gear set having a plurality of planet gear interconnected drive and drive receiving elements a first one of which is driven from said drive shaft, a second planet gear set having a plurality of planet gear interconnected drive and drive receiving elements a first one of which is connected to drive said driven shaft, a second one of said elements of said first gear set being connected in driving relation with a second element of said second planet gear set, a clutch for connecting a third element of said first planet gear set with a third element of said second planet gear set, and a brake for one of said last-named elements for holding said third elements stationary when said clutch is also engaged for rendering these elements reaction elements for completing a drive between said shafts through said two planet gear sets, and a second brake effective on another element of said first gear set for completing a drive between said shafts when said clutch is also engaging during which drive power flows in two paths between two gear sets one path being between said second elements and the other path being between said third elements, and a second clutch for effectively connecting together two elements of said first planet gear set for completing a substantially one to one drive between said shafts when said first-named clutch is also engaged and in which the power flows similarly in two paths between said two gear sets, said first-named brake and said last-named clutch being constructed and arranged so that when both are engaged completing still another drive between said shafts during which drive said first-named brake holds said third element of said second gear set against rotation to function as a reaction element and said second-named clutch substantially locks up the elements of said first gear set so that they rotate substantially as a unit.

References Cited in the file of this patent

UNITED STATES PATENTS

| 2,156,041 | Duffield | Apr. 25, 1939 |
| 2,194,954 | Ravigneaux | Mar. 26, 1940 |
| 2,204,779 | Swennes | June 18, 1940 |
| 2,214,335 | Kurti | Sept. 10, 1940 |
| 2,324,733 | Smirl | July 20, 1943 |
| 2,406,225 | Kelbel | Aug. 20, 1946 |
| 2,454,014 | Seybold | Nov. 16, 1948 |
| 2,570,327 | Dodge | Oct. 9, 1951 |
| 2,606,459 | Carnegie | Aug. 12, 1952 |
| 2,736,407 | Smirl | Feb. 28, 1956 |
| 2,749,775 | Simpson | June 12, 1956 |
| 2,834,228 | Place | May 13, 1958 |

FOREIGN PATENTS

| 993,137 | France | Oct. 26, 1951 |

UNITED STATES PATENT OFFICE
CERTIFICATE OF CORRECTION

Patent No. 2,923,178                        February 2, 1960

James A. Miller

It is hereby certified that error appears in the printed specification of the above numbered patent requiring correction and that the said Letters Patent should read as corrected below.

Column 10, line 6, after "gear set" and before the period insert -- different pairs of said brakes being engageable to complete two different change speed drives between said shafts and two different pairs of a clutch and a brake being engageable to complete other change speed drives between said shafts and said clutches being engageable together to complete a direct drive between said shafts --.

Signed and sealed this 16th day of August 1960.

(SEAL)
Attest:

KARL H. AXLINE                                   ROBERT C. WATSON
Attesting Officer                                 Commissioner of Patents